US00RE47162E

(19) United States
(12) Reissued Patent
Oren et al.

(10) Patent Number: US RE47,162 E
(45) Date of Reissued Patent: Dec. 18, 2018

(54) PROPPANT VESSEL

(71) Applicant: Oren Technologies, LLC, Houston, TX (US)

(72) Inventors: John Oren, Houston, TX (US); Joshua Oren, Houston, TX (US)

(73) Assignee: OREN TECHNOLOGIES, LLC, Houston, TX (US)

(21) Appl. No.: 29/500,681

(22) Filed: Aug. 27, 2014

Related U.S. Patent Documents

Reissue of:
(64) Patent No.: Des. 688,351
Issued: Aug. 20, 2013
Appl. No.: 29/436,170
Filed: Nov. 2, 2012

(51) LOC (11) Cl. ..... 23-01
(52) U.S. Cl.
USPC ..... D23/202
(58) Field of Classification Search
USPC ..... D23/202–206; 222/185.1, 460; 206/386, 206/600; 414/813; 220/581
See application file for complete search history.

(56) References Cited

U.S. PATENT DOCUMENTS 137,871 A 4/1873 Worsley
150,894 A 5/1874 Safely
384,443 A 6/1888 Hoover
448,238 A 3/1891 Johnson
710,611 A 10/1902 Ray
711,632 A 10/1902 Johnson
917,649 A 4/1909 Otto
1,143,641 A 6/1915 McGregor
1,331,883 A 2/1920 Stuart
1,344,768 A 6/1920 Messiter
1,434,488 A 11/1922 Forsythe et al.
1,520,560 A 12/1923 Burno
1,506,936 A 9/1924 Lea
1,526,527 A 2/1925 Butler
1,573,664 A 2/1926 Wetherill
1,807,447 A 5/1931 Smith
1,850,000 A 3/1932 Fernand
1,932,320 A 10/1933 Steward
1,973,312 A 9/1934 Hardinge
2,020,628 A 11/1935 Woodruff
2,233,005 A 2/1941 Garlinghouse
2,255,448 A 9/1941 Morris
2,293,160 A 8/1942 Miller et al.
2,368,672 A 2/1945 McNamara
2,381,103 A 8/1945 Frank
2,385,245 A 9/1945 Willoughby
2,413,661 A 12/1946 Stokes
2,423,879 A 7/1947 De Frees
2,563,470 A 8/1951 Kane
2,564,020 A 8/1951 Mengel
2,603,342 A 7/1952 Martinson
2,616,758 A 11/1952 Meyers
2,622,771 A 12/1952 Tulou
2,652,174 A 9/1953 Shea et al.
2,670,866 A 3/1954 Glesby
2,678,145 A 5/1954 Ejuzwiak et al.
2,693,282 A 11/1954 Sensibar
2,700,574 A 1/1955 Tourneau
2,792,262 A 4/1955 Hathom
2,774,515 A 12/1956 Johansson et al.
2,791,973 A 5/1957 Dorey
2,801,125 A 7/1957 Page et al.
2,808,164 A 10/1957 Glendinning
2,812,970 A 11/1957 Martinson
2,837,369 A 6/1958 Stopps
2,865,521 A 12/1958 Fisher et al.
2,873,036 A 2/1959 Noble
2,894,666 A 7/1959 Campbell, Jr.
2,988,235 A 6/1961 Ronyak
2,994,460 A 8/1961 Matthews
3,041,113 A 6/1962 Sackett
3,049,248 A 8/1962 Heltzel et al.
3,064,832 A 11/1962 Heltzel
3,083,879 A 4/1963 Coleman
3,090,527 A 5/1963 Rensch
3,109,389 A 11/1963 Karlsson
3,122,258 A 2/1964 Raymond
3,134,606 A 5/1964 Oyler
3,135,432 A 6/1964 McKinney
3,163,127 A 12/1964 Gutridge et al.
3,187,684 A 6/1965 Ortner
3,198,494 A 8/1965 Curran et al.
3,199,585 A 8/1965 Cronberger
3,248,026 A 4/1966 Kemp
3,255,927 A 6/1966 Ruppert et al.
3,265,443 A 8/1966 Simas
3,270,921 A 9/1966 Nadolske et al.

3,281,006 A 10/1966 Wei
3,294,306 A 12/1966 Areddy
3,318,473 A 5/1967 Jones et al.
3,326,572 A 6/1967 Murray
3,343,688 A 9/1967 Ross
3,353,599 A 11/1967 Swift
3,354,918 A 11/1967 Coleman
3,378,152 A 4/1968 Warner
3,387,570 A 6/1968 Pulcrano et al.
3,396,675 A 8/1968 Stevens
3,397,654 A 8/1968 Snyder
3,406,995 A 10/1968 McCarthy
3,407,971 A 10/1968 Oehler
3,425,599 A 2/1969 Sammarco et al.
3,455,474 A 7/1969 Truncali
3,476,270 A 11/1969 Cox et al.
D216,511 S * 1/1970 Coleman ..... D23/202
3,499,694 A 3/1970 Coppel
3,508,762 A 4/1970 Pratt
3,524,567 A 8/1970 Coleman
3,528,570 A 9/1970 Pase
3,587,834 A 6/1971 Dugge
3,596,609 A 8/1971 Ortner
3,601,244 A 8/1971 Ort et al.
3,602,400 A 8/1971 Cooke
3,650,567 A 3/1972 Danielson
3,653,521 A 4/1972 Bridge
3,661,293 A 5/1972 Gerhard et al.
3,692,363 A 9/1972 Tenebaum et al.
3,704,797 A 12/1972 Suykens
3,721,199 A 3/1973 Hassenauer
3,729,121 A 4/1973 Cannon
3,734,215 A 5/1973 Smith
3,738,511 A 6/1973 Lemon et al.
3,752,511 A 8/1973 Racy
3,777,909 A 12/1973 Rheinfrank
3,785,534 A 1/1974 Smith
3,800,712 A 4/1974 Krug, Jr.
3,802,584 A 4/1974 Sackett
3,817,261 A 6/1974 Rogge
3,820,762 A 6/1974 Bostrom et al.
3,827,578 A 8/1974 Hough
3,840,141 A 10/1974 Allom et al.
3,854,612 A 12/1974 Snape
3,861,716 A 1/1975 Baxter et al.
3,883,005 A 5/1975 Stevens
3,909,223 A 9/1975 Schmidt
3,933,100 A 1/1976 Dugge
3,963,149 A 6/1976 Fassauer
3,970,123 A 7/1976 Poulton et al.
3,986,708 A 10/1976 Hellzel et al.
3,997,089 A 12/1976 Clarke et al.
4,003,301 A 1/1977 Norton
4,004,700 A 1/1977 Empey
4,057,153 A 11/1977 Weaver
4,058,239 A 11/1977 Van Mill
4,063,656 A 12/1977 Lambert
4,073,410 A 2/1978 Melcher
4,125,195 A 11/1978 Sasadi
4,138,163 A 2/1979 Calvert et al.
4,178,117 A 12/1979 Brugler
4,204,773 A 5/1980 Bates
4,210,273 A 7/1980 Hegele
4,210,963 A 7/1980 Ricciardi et al.
RE30,358 E 8/1980 Sensibar
4,222,498 A 9/1980 Brock
4,227,732 A 10/1980 Kish
4,245,820 A 1/1981 Muryn
4,247,228 A 1/1981 Gray et al.
4,247,370 A 1/1981 Nijhawan et al.
4,258,953 A 3/1981 Johnson
4,265,266 A 5/1981 Kierbow et al.
4,278,190 A 7/1981 Oory et al.
4,282,988 A 8/1981 Hulbert, Jr.
4,287,921 A 9/1981 Sanford
4,287,997 A 9/1981 Rolfe et al.
4,289,353 A 9/1981 Merritt
4,299,597 A 11/1981 Oetiker et al.
4,306,895 A 12/1981 Thompson et al.
4,329,106 A 5/1982 Adler
4,350,241 A 9/1982 Wenzel
4,359,176 A 11/1982 Johnson
4,363,396 A 12/1982 Wolf et al.
4,397,406 A 8/1983 Croley
4,398,653 A 8/1983 Daloisio
4,402,392 A 9/1983 Fabian et al.
4,407,202 A 10/1983 McCormick
4,408,886 A 10/1983 Sampson et al.
4,410,106 A 10/1983 Kierbow et al.
4,420,285 A 12/1983 Loyer et al.
4,427,133 A 1/1984 Kierbow et al.
4,428,504 A 1/1984 Bassett et al.
4,449,861 A 5/1984 Saito et al.
4,453,645 A 6/1984 Usui et al.
4,474,204 A 10/1984 West
4,475,672 A 10/1984 Whitehead
4,478,155 A 10/1984 Cena et al.
4,483,462 A 11/1984 Heintz
4,513,755 A 4/1985 Baroni
4,525,071 A 6/1985 Horowitz
4,526,353 A 7/1985 Stomp
4,532,098 A 7/1985 Campbell
4,552,573 A 11/1985 Weis
4,569,394 A 2/1986 Sweatman et al.
4,571,143 A 2/1986 Hellerich
4,588,605 A 5/1986 Frei et al.
4,608,931 A 9/1986 Ruhmann et al.
4,619,531 A 10/1986 Dunstan
4,624,729 A 11/1986 Bresciani et al.
4,626,155 A 12/1986 Hlinsky et al.
4,626,166 A 12/1986 Jolly
4,628,825 A 12/1986 Taylor et al.
4,648,584 A 3/1987 Wamser
4,660,733 A 4/1987 Snyder et al.
4,701,095 A 10/1987 Berryman et al.
4,714,010 A 12/1987 Smart
4,715,754 A 12/1987 Scully
4,741,273 A 5/1988 Sherwood
4,761,039 A 8/1988 Hilaris
4,798,039 A 1/1989 Deglise
4,801,389 A 1/1989 Brannon et al.
4,819,830 A 4/1989 Schultz
4,836,510 A 6/1989 Weber et al.
4,836,735 A 6/1989 Dennehy
4,848,605 A 7/1989 Wise
4,882,784 A 11/1989 Tump
4,889,219 A 12/1989 Key
4,901,649 A 2/1990 Fehrenbach et al.
4,909,378 A 3/1990 Webb
4,909,556 A 3/1990 Koskinen
4,917,019 A 4/1990 Hesch et al.
4,919,583 A 4/1990 Speakman, Jr.
4,923,358 A 5/1990 Van Mill
4,946,068 A 8/1990 Erickson et al.
4,947,760 A 8/1990 Dawson et al.
4,949,714 A 8/1990 Orr
4,954,975 A 9/1990 Kalata
4,956,821 A 9/1990 Fenelon
4,964,243 A 10/1990 Reiter
4,975,205 A 12/1990 Sloan
4,975,305 A 12/1990 Biginelli
4,988,115 A 1/1991 Steinke
4,995,522 A 2/1991 Barr
5,004,400 A 4/1991 Handke
5,028,002 A 7/1991 Whitford
5,042,538 A 8/1991 Wiese
5,080,259 A 1/1992 Hadley
5,082,304 A 1/1992 Preller
5,102,281 A 4/1992 Handke
5,102,286 A 4/1992 Fenton
5,105,858 A 4/1992 Levinson
5,131,524 A 7/1992 Uehara
5,167,719 A 12/1992 Tamaki
5,190,182 A 3/1993 Copas et al.
5,195,861 A 3/1993 Handke
5,199,826 A 4/1993 Lawrence
5,201,546 A 4/1993 Lindsay
5,224,635 A 7/1993 Wise 5,253,746 A 10/1993 Friesen et al.
5,253,776 A 10/1993 Decroix et al.
5,265,763 A 11/1993 Heinrici et al.
5,280,883 A 1/1994 Ibar
5,286,158 A 2/1994 Zimmerman
5,286,294 A 2/1994 Ebi et al.
5,290,139 A 3/1994 Hedrick
5,317,783 A 6/1994 Williamson
5,320,046 A 6/1994 Hesch
5,324,097 A 6/1994 DeCap
5,339,996 A 8/1994 Dubbert
5,345,982 A 9/1994 Nadeau et al.
5,358,137 A 10/1994 Shuert et al.
5,373,792 A 12/1994 Pileggi et al.
5,392,946 A 2/1995 Holbrook et al.
5,402,915 A 4/1995 Hogan
5,413,154 A 5/1995 Hurst et al.
5,441,321 A 8/1995 Karpisek
5,465,829 A 11/1995 Kruse
5,470,175 A 11/1995 Jensen et al.
5,470,176 A 11/1995 Corcoran et al.
5,493,852 A 2/1996 Stewart
5,498,119 A 3/1996 Faivre
5,507,514 A 4/1996 Jacques
5,538,286 A 7/1996 Hoff
5,549,278 A 8/1996 Sidler
5,564,599 A 10/1996 Barber et al.
5,570,743 A 11/1996 Padgett et al.
5,590,976 A 1/1997 Kilheffer et al.
5,601,181 A 2/1997 Lindhorst
5,602,761 A 2/1997 Spoerre et al.
5,613,446 A 3/1997 DiLuigi et al.
5,617,974 A 4/1997 Sawyer
5,647,514 A 7/1997 Toth et al.
RE35,580 E 8/1997 Heider et al.
5,667,298 A 9/1997 Musil
5,690,466 A 11/1997 Gaddis et al.
5,697,535 A 12/1997 Coleman
5,704,477 A * 1/1998 Hermann et al. ..... 206/386
5,718,555 A 2/1998 Swalheim
5,722,552 A 3/1998 Olson
5,722,688 A 3/1998 Garcia
5,746,258 A 5/1998 Huck
5,772,390 A 6/1998 Walker
5,782,524 A 7/1998 Heider et al.
5,785,421 A 7/1998 Milek
5,803,296 A 9/1998 Olson
5,806,863 A 9/1998 Heger et al.
5,836,480 A 11/1998 Epp et al.
5,845,799 A 12/1998 Deaton
5,876,172 A 3/1999 Di Rosa
5,906,471 A 5/1999 Schwoerer
5,911,337 A 6/1999 Bedeker
5,927,558 A 7/1999 Bruce
5,960,974 A 10/1999 Kee
5,971,219 A 10/1999 Karpisek
5,993,202 A 11/1999 Yamazaki et al.
5,997,099 A 12/1999 Collins
6,002,063 A 12/1999 Bilak et al.
6,006,918 A 12/1999 Hart
6,069,118 A 5/2000 Hinkel et al.
6,092,974 A 7/2000 Roth
6,109,486 A 8/2000 Lee
6,120,233 A 9/2000 Adam
D431,358 S 10/2000 Willemsen
6,155,175 A 12/2000 Rude et al.
6,186,654 B1 2/2001 Gunteret et al.
6,190,107 B1 2/2001 Lanigan et al.
6,192,985 B1 2/2001 Hinkel et al.
6,196,590 B1 3/2001 Kim
6,205,938 B1 3/2001 Foley et al.
6,247,594 B1 6/2001 Garton
6,263,803 B1 7/2001 Dohr et al.
6,269,849 B1 8/2001 Fields
6,273,154 B1 8/2001 Laug
6,283,212 B1 9/2001 Hinkel et al.
6,286,986 B2 9/2001 Grimland
6,296,109 B1 10/2001 Nohl
6,306,800 B1 10/2001 Samuel et al.
6,328,156 B1 12/2001 Otsman
6,328,183 B1 12/2001 Coleman
6,374,915 B1 4/2002 Andrews
6,382,446 B1 5/2002 Hinkle et al.
6,390,742 B1 5/2002 Breeden
6,401,983 B1 6/2002 McDonald et al.
6,412,422 B2 7/2002 Dohr et al.
6,415,909 B1 7/2002 Mitchell et al.
6,416,271 B1 7/2002 Pigott et al.
6,422,413 B1 7/2002 Hall et al.
6,425,725 B1 7/2002 Ehlers
6,450,522 B1 9/2002 Yamada et al.
6,457,291 B2 10/2002 Wick
6,498,976 B1 12/2002 Ehlbeck et al.
6,505,760 B1 1/2003 Werner
6,508,387 B1 1/2003 Simon et al.
6,508,615 B2 1/2003 Taylor
6,523,482 B2 2/2003 Wingate
6,537,002 B2 3/2003 Gloystein
6,575,614 B2 6/2003 Tosco et al.
6,660,693 B2 12/2003 Miller et al.
6,663,373 B2 12/2003 Yoshida
6,666,573 B2 12/2003 Grassi
6,675,066 B2 1/2004 Moshgbar
6,675,073 B2 1/2004 Kieman et al.
6,705,449 B2 3/2004 Wagstaffe
6,720,290 B2 4/2004 England et al.
6,772,912 B1 8/2004 Schall et al.
6,774,318 B2 8/2004 Beal et al.
6,776,235 B1 8/2004 England
6,783,032 B2 8/2004 Fons
6,828,280 B2 12/2004 England et al.
6,835,041 B1 12/2004 Albert
6,882,960 B2 4/2005 Miller
6,902,061 B1 6/2005 Elstone
6,915,854 B2 7/2005 England et al.
6,953,119 B1 10/2005 Wening
6,955,127 B2 10/2005 Taylor
6,964,551 B1 11/2005 Friesen
6,968,946 B2 11/2005 Shuert
6,974,021 B1 12/2005 Boevers
7,008,163 B2 3/2006 Russell
7,036,662 B2 * 5/2006 Schutz ..... 206/386
7,051,661 B2 5/2006 Herzog et al.
7,084,095 B2 8/2006 Lee et al.
7,104,425 B2 9/2006 Le Roy
7,140,516 B2 11/2006 Bothor
7,146,914 B2 12/2006 Morton et al.
7,201,290 B2 4/2007 Mehus et al.
7,214,028 B2 5/2007 Boasso
7,240,681 B2 7/2007 Saik
7,252,309 B2 8/2007 Eng Goh
7,284,579 B2 10/2007 Elgan et al.
7,284,670 B2 10/2007 Schmid
7,316,333 B2 1/2008 Wegner
7,367,271 B2 5/2008 Early
7,377,219 B2 5/2008 Brandt
7,410,623 B2 8/2008 Mehus et al.
7,475,796 B2 1/2009 Garton
7,500,817 B2 3/2009 Furrer et al.
7,513,280 B2 4/2009 Brashears et al.
7,591,386 B2 9/2009 Hooper
7,640,075 B2 12/2009 Wietgrefe
7,695,538 B2 4/2010 Cheng
7,753,637 B2 7/2010 Benedict et al.
7,798,558 B2 9/2010 Messier
7,802,958 B2 9/2010 Garcia et al.
7,803,321 B2 9/2010 Lark et al.
7,837,427 B2 11/2010 Beckel
7,841,394 B2 11/2010 McNeel et al.
7,845,516 B2 12/2010 Pessin et al.
7,858,888 B2 12/2010 Lucas et al.
7,867,613 B2 1/2011 Smith
7,878,327 B2 * 2/2011 Cassina ..... 206/386
7,891,304 B2 2/2011 Herzog et al.
7,891,523 B2 2/2011 Mehus et al.
7,896,198 B2 3/2011 Mehus et al.
7,897,223 B2 * 3/2011 Schubbach et al. ..... 428/35.7
7,921,783 B2 4/2011 Forbes et al.

7,958,995 B2 * 6/2011 Dedmon et al. ..... 206/386
7,967,161 B2 6/2011 Townsend
7,980,803 B2 7/2011 Brandstätter et al.
7,997,213 B1 8/2011 Gauthier et al.
7,997,623 B2 8/2011 Williams
8,083,083 B1 12/2011 Mohns
8,201,520 B2 6/2012 Meritt
8,313,278 B2 11/2012 Simmons et al.
8,366,349 B2 2/2013 Beachner
8,375,690 B2 2/2013 LaFargue et al.
8,379,927 B2 2/2013 Taylor
8,387,824 B2 3/2013 Wietgrefe
8,393,502 B2 3/2013 Renyer et al.
8,424,666 B2 4/2013 Berning et al.
D688,351 S 8/2013 Oren
8,505,780 B2 8/2013 Oren
8,544,419 B1 10/2013 Spalding et al.
8,545,148 B2 10/2013 Wanek-Pusset et al.
8,562,022 B2 10/2013 Nadeau et al.
8,573,387 B2 11/2013 Trimble
8,573,917 B2 11/2013 Renyer
8,585,341 B1 11/2013 Oren
D694,670 S 12/2013 Oren
8,616,370 B2 12/2013 Allegretti
8,622,251 B2 1/2014 Oren
8,636,832 B2 1/2014 Stutzman et al.
8,646,641 B2 2/2014 Moir
8,668,430 B2 3/2014 Oren
D703,582 S 4/2014 Oren
8,820,559 B2 9/2014 Beitler et al.
8,827,118 B2 9/2014 Oren
8,887,914 B2 11/2014 Allegretti
8,905,266 B2 12/2014 De Brabanter
8,915,691 B2 12/2014 Mintz
9,051,801 B1 6/2015 Mintz
9,052,034 B1 6/2015 Wegner et al.
D740,556 S 10/2015 Huber
9,162,261 B1 10/2015 Smith
9,267,266 B2 2/2016 Cutler et al.
9,309,064 B2 4/2016 Sheesley
D780,883 S 3/2017 Schaffner et al.
D783,771 S 4/2017 Stegemoeller et al.
D783,772 S 4/2017 Stegemoeller, III et al.
9,624,036 B2 4/2017 Luharuka et al.
9,688,492 B2 6/2017 Stutzman et al.
9,796,318 B1 10/2017 Nolasco
2001/0022308 A1 9/2001 Epp et al.
2001/0038777 A1 11/2001 Cassell
2001/0045338 A1 11/2001 Ransil et al.
2002/0134550 A1 9/2002 Leeson et al.
2002/0139643 A1 10/2002 Peltier et al.
2003/0006248 A1 1/2003 Gill et al.
2003/0111470 A1 6/2003 Fouillet et al.
2003/0145418 A1 8/2003 Ikeda et al.
2003/0156929 A1 8/2003 Russell
2004/0065699 A1 4/2004 Schoer et al.
2004/0074922 A1 4/2004 Bother et al.
2004/0084874 A1 5/2004 McDougall et al.
2004/0206646 A1 10/2004 Goh
2004/0245284 A1 12/2004 Mehus et al.
2005/0158158 A1 7/2005 Porta
2005/0201851 A1 9/2005 Jonkka
2006/0012183 A1 1/2006 Marchiori et al.
2006/0027582 A1 2/2006 Beach
2006/0053582 A1 3/2006 Engel et al.
2006/0091072 A1 5/2006 Schmid et al.
2006/0151058 A1 7/2006 Salaoras et al.
2006/0180062 A1 8/2006 Furrer et al.
2006/0180232 A1 8/2006 Glewwe et al.
2006/0239806 A1 10/2006 Yelton
2006/0267377 A1 11/2006 Lusk et al.
2006/0277783 A1 12/2006 Garton
2006/0289166 A1 12/2006 Stromquist et al.
2007/0096537 A1 5/2007 Hicks
2007/0125543 A1 6/2007 McNeel et al.
2007/0194564 A1 8/2007 Garceau et al.
2008/0008562 A1 1/2008 Beckel et al.
2008/0029553 A1 2/2008 Culleton
2008/0058228 A1 3/2008 Wilson
2008/0017905 A1 7/2008 McGough et al.
2008/0029546 A1 7/2008 Schuld
2008/0179324 A1 7/2008 McGough et al.
2008/0213073 A1 9/2008 Benedict et al.
2008/0226434 A1 9/2008 Smith et al.
2008/0264641 A1 10/2008 Slabaugh et al.
2008/0277423 A1 11/2008 Garton
2008/0315558 A1 12/2008 Cesterino
2009/0038242 A1 2/2009 Cope
2009/0078410 A1 3/2009 Krenek et al.
2009/0278326 A1 11/2009 Rowland et al.
2010/0021258 A1 1/2010 Kim
2010/0037572 A1 2/2010 Cheng
2010/0038143 A1 2/2010 Burnett et al.
2010/0040446 A1 2/2010 Renyer
2010/0065466 A1 3/2010 Perkins
2010/0108711 A1 5/2010 Wietgrefe
2010/0129193 A1 5/2010 Sherrer
2010/0199668 A1 8/2010 Coustou et al.
2010/0207371 A1 8/2010 Van Houdt et al.
2010/0278621 A1 11/2010 Redekop
2010/0288603 A1 11/2010 Schafer
2010/0320727 A1 12/2010 Haut et al.
2011/0011893 A1 1/2011 Cerny
2011/0017693 A1 1/2011 Thomas
2011/0101040 A1 5/2011 Weissbrod
2011/0109073 A1 5/2011 Williams
2011/0121003 A1 5/2011 Moir
2011/0127178 A1 6/2011 Claussen
2011/0160104 A1 6/2011 Wu et al.
2011/0162838 A1 7/2011 Mackenzie et al.
2011/0168593 A1 7/2011 Neufeld et al.
2011/0222983 A1 9/2011 Dugic et al.
2011/0297702 A1 12/2011 Hildebrandt et al.
2012/0017812 A1 1/2012 Renyer
2012/0103848 A1 5/2012 Allegretti et al.
2012/0219391 A1 8/2012 Teichrob et al.
2012/0247335 A1 10/2012 Stutzman et al.
2012/0255539 A1 10/2012 Kolecki
2013/0004272 A1 1/2013 Mintz
2013/0022441 A1 1/2013 Uhlyn et al.
2013/0206415 A1 8/2013 Sheesley
2013/0209204 A1 8/2013 Sheesley
2013/0233545 A1 9/2013 Mahoney
2013/0284729 A1 10/2013 Cook et al.
2013/0309052 A1 11/2013 Luharuka
2013/0323005 A1 12/2013 Rexius et al.
2014/0020765 A1 1/2014 Oren
2014/0020892 A1 1/2014 Oren
2014/0023465 A1 1/2014 Oren et al.
2014/0034662 A1 2/2014 Chalmers et al.
2014/0044507 A1 2/2014 Naizer et al.
2014/0093319 A1 4/2014 Harris et al.
2014/0097182 A1 4/2014 Sheesley
2014/0166647 A1 6/2014 Sheesley
2014/0203046 A1 7/2014 Allegretti
2014/0234059 A1 8/2014 Thomeer
2014/0321950 A1 10/2014 Krenek et al.
2014/0377042 A1 12/2014 McMahon
2015/0004895 A1 1/2015 Hammers et al.
2015/0069052 A1 3/2015 Allegretti et al.
2015/0079890 A1 3/2015 Stutzman et al.
2015/0086308 A1 3/2015 McIver et al.
2015/0110565 A1 4/2015 Harris
2015/0159232 A1 6/2015 Zucchi et al.
2015/0209829 A1 7/2015 De Siqueira et al.
2016/0148813 A1 5/2016 Rogers et al.
2016/0185522 A1 6/2016 Herman et al.
2016/0280480 A1 9/2016 Smith et al.
2017/0129721 A1 5/2017 Harris et al.
2017/0217353 A1 8/2017 Vander Pol
2018/0009401 A1 1/2018 Miller et al.

FOREIGN PATENT DOCUMENTS

CA 2023138 2/1992
CA 2791088 3/2013
CN 2037354 5/1989
CN 2059909 8/1990

| | | |
|---|---|---|
| CN | 2075632 | 4/1991 |
| CN | 1329562 | 1/2002 |
| CN | 2517684 | 10/2002 |
| CN | 1635965 | 7/2005 |
| CN | 2913250 | 6/2007 |
| CN | 201390486 | 1/2010 |
| CN | 101823630 | 9/2010 |
| CN | 102101595 | 6/2011 |
| CN | 201881469 | 6/2011 |
| CN | 102114985 | 7/2011 |
| CN | 203033469 | 7/2013 |
| CN | 103350017 | 10/2013 |
| DE | 3108121 | 9/1982 |
| DE | 3342281 | 6/1985 |
| DE | 4217329 | 5/1993 |
| DE | 20317967 | 3/2004 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |
| EP | 1775190 | 4/2007 |
| EP | 1795467 | 6/2007 |
| EP | 2062832 | 5/2009 |
| EP | 2311757 | 4/2011 |
| FR | 2173445 | 10/1973 |
| FR | 2640598 | 6/1990 |
| GB | 1296736 | 11/1972 |
| GB | 2204847 | 11/1988 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| JP | 11034729 | 2/1999 |
| MX | 2012011046 | 5/2013 |
| WO | 1990008082 | 7/1990 |
| WO | 1992002437 | 2/1992 |
| WO | 1993001997 | 2/1993 |
| WO | 1993006031 | 4/1993 |
| WO | 1996025302 | 8/1996 |
| WO | 2006039757 | 4/2006 |
| WO | 2007005054 | 1/2007 |
| WO | 2007057398 | 5/2007 |
| WO | 2007061310 | 5/2007 |
| WO | 2008012513 | 1/2008 |
| WO | 2010026235 | 3/2010 |
| WO | 2012021447 | 2/2012 |
| WO | 2012058059 | 5/2012 |
| WO | 2011099358 | 6/2013 |

OTHER PUBLICATIONS

International Search Report for related International Application No. PCT/US2012/066639, dated Feb. 25, 2013.
International Search Report for related International Application No. PCT/US2013/035442, dated Jun. 23, 2013.
International Search Report for related International Application No. PCT/US2013/032819, dated May 23, 2013.
International Search Report for related International Application No. PCT/US2013/049028, dated Mar. 4, 2014.
International Preliminary Report on Patentability for PCT/US2012/066639, dated Feb. 26, 2013.
International Preliminary Report on Patentability for PCT/US2013/032819, Sep. 23, 2014.
International Search Report for PCT/US15/35635, dated Oct. 30, 2015. (12 pages).
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/ http://www.nov.com/Well_Service_and_Completion/Frac_Sand_Handling_Equipment/Frac_Sanders/FS-35.aspx).
International Search Report for PCT/US2015/024810, Jul. 8, 2015. (13 pages).
SandBox Logistics, "Mine to Wellhead Logistics," Houston, TX, May 2013.
SandBox Logistics, screenshots from video made in Apr. 2013 and publicly shown in May 2013, Arnegard, North Dakota.
European Search Report for Application No. 15167039.5, dated Sep. 8, 2015. (7 pages).
Non-Final Office Action dated Oct. 27, 2016 for co-pending U.S. Appl. No. 15/219,676.
Non-Final Office Action dated Nov. 9, 2016 for co-pending U.S. Appl. No. 14/948,494.
Final Office Action dated Nov. 4, 2016 for co-pending U.S. Appl. No. 14/738,485.
Non-Final Office Action dated Apr. 3, 2017 for co-pending U.S. Appl. No. 13/555,635.
Non-Final Office Action dated Feb. 14, 2017 for co-pending U.S. Appl. No. 14/943,111.
Final Office Action dated Mar. 7, 2017 for co-pending U.S. App. No. 15/144,296.
Non-Final Office Action dated Apr. 6, 2017 for co-pending U.S. Appl. No. 13/768,962.
Non-Final Office Action dated Mar. 6, 2017 for co-pending U.S. Appl. No. 15/152,744.
Non-Final Office Action dated Feb. 24, 2017 for co-pending U.S. Appl. No. 14/943,182.
Solaris Oilfield Infrastructure, Mobile Sand Silo System, 2016.
Final Office Action dated Sep. 27, 2016 for co-pending U.S. Appl. No. 13/555,635.
Non- Final Office Action dated Mar. 23, 2016 for co-pending U.S. Appl. No. 13/555,635.
Final Office Action dated Jul. 30, 2015 for co-pending U.S. Appl. No. 13/555,635.
Non-Final Office Action dated Oct. 22, 2014 for co-pending U.S. Appl. No. 13/555,635.
Final Office Action dated Jun. 21, 2016 for co-pending U.S. Appl. No. 13/628,702.
Non-Final Office Action dated Feb. 23, 2016 for co-pending U.S. Appl. No. 13/628,702.
Final Office Action dated Sep. 22, 2015 for co-pending U.S. Appl. No. 13/628,702.
Non-Final Office Action dated Jul. 28, 2015 for co-pending U.S. Appl. No. 13/628,702.
Final Office Action dated Mar. 24, 2015 for co-pending U.S. Appl. No. 13/628,702.
Non-Final Office Action dated Sep. 18, 2014 for co-pending U.S. Appl. No. 13/628,702.
Final Office Action dated Jun. 27, 2016 for co-pending U.S. Appl. No. 14/831,924
Non-Final Office Action dated Feb. 16, 2016 for co-pending U.S. Appl. No. 14/831,924.
Final Office Action dated Jun. 27, 2016 for co-pending U.S. Appl. No. 14/923,920.
Non-Final Office Action dated Feb. 9, 2016 for co-pending U.S. Appl. No. 14/923,920.
Final Office Action dated Sep. 15, 2016 for co-pending U.S. Appl. No. 14/943,111.
Non-Final Office Action dated Apr. 5, 2016 for co-pending U.S. Appl. No. 14/943,111.
Final Office Action dated Jul. 18, 2016 for co-pending U.S. Appl. No. 14/948,494.
Non-Final Office Action dated Apr. 8, 2016 for co-pending U.S. Appl. No. 14/948,494.
Non-Final Office Action dated Sep. 6, 2016 for co-pending U.S. Appl. No. 15/144,296.
Non-Final Office Action dated Jul. 25, 2016 for co-pending U.S. Appl. No. 13/660,855.
Final Office Action dated Apr. 28, 2016 for co-pending U.S. Appl. No. 13/660,855.
Non-Final Office Action dated Oct. 6, 2015 for co-pending U.S. Appl. No. 13/660,855.
Final Office Action dated Aug. 6, 2015 for co-pending U.S. Appl. No. 13/660,855.

Non-Final Office Action dated Apr. 29, 2015 for co-pending U.S. Appl. No. 13/660,855.
Final Office Action dated Dec. 17, 2014 for co-pending U.S. Appl. No. 13/660,855.
Non-Final Office Action dated Sep. 4, 2014 for co-pending U.S. Appl. No. 13/660,855.
Final Office Action dated Sep. 24, 2013 for co-pending U.S. Appl. No. 13/660,855.
Non-Final Office Action dated May 14, 2013 for co-pending U.S. Appl. No. 13/660,855.
Non-Final Office Action dated Jul. 5, 2016 for co-pending U.S. Appl. No. 14/996,362.
Non-Final Office Action dated Jul. 6, 2016 for co-pending U.S. Appl. No. 15/144,450.
Final Office Action dated Sep. 29, 2016 for co-pending U.S. Appl. No. 13/768,962.
Non-Final Office Action dated Apr. 5, 2016 for co-pending U.S. Appl. No. 13/768,962.
Final Office Action dated Oct. 9, 2015 for co-pending U.S. Appl. No. 13/768,962.
Non-Final Office Action dated May 1, 2015 for co-pending U.S. Appl. No. 13/768,962.
Non-Final Office Action dated Jul. 18, 2016 for co-pending U.S. Appl. No. 15/152,744.
Non-Final Office Action dated Apr. 13, 2016 for co-pending U.S. Appl. No. 14/738,485.
Non-Final Office Action dated Sep. 7, 2016 for co-pending U.S. Appl. No. 14/841,942.
Final Office Action dated May 12, 2016 for co-pending U.S. App. No. 14/841,942.
Non-Final Office Action dated Nov. 30, 2015 for co-pending U.S. Appl. No. 14/841,942.
Non-Final Office Action dated Jul. 21, 2016 for co-pending U.S. Appl. No. 15/083,596.
Non-Final Office Action dated Aug. 19, 2016 for co-pending U.S. Appl. No. 15/084,611.
Non-Final Office Action dated Sep. 6, 2016 for co-pending U.S. Appl. No. 15/143,942.
Final Office Action dated Sep. 1, 2016 for co-pending U.S. Appl. No. 14/848,447.
Non-Final Office Action dated Apr. 8, 2016 for co-pending U.S. Appl. No. 14/848,447.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
PCT International Search Report for PCT/US15/49074, dated Dec. 17, 2015. (11 pages).
PCT International Search Report for PCT/US15/57601, May 6, 2016. (11 pages).
SandBox Logistics, LLC, screenshots from video dated Sep. 19, 2013.
SandBox Logistics, LLC, screenshots from video dated Aug. 22, 2014.
Non-Final Office Action dated May 13, 2016 for co-pending U.S. Appl. No. 14/986,826.
Final Office Action dated Sep. 15, 2016 for co-pending U.S. Appl. No. 14/922,836.
Non-Final Office Action dated Feb. 4, 2016 for co-pending U.S. Appl. No. 14/922,836.
Final Office Action dated Aug. 25, 2016 for co-pending U.S. Appl. No. 14/927,614.
Non-Final Office Action dated Mar. 1, 2016 for co-pending U.S. Appl. No. 14/927,614.
Non-Final Office Action dated Apr. 29, 2016 for co-pending U.S. App. No. 14/943,182.
Final Office Action dated Sep. 15, 2016 for co-pending U.S. Appl. No. 14/882,973.
Non-Final Office Action dated Feb. 11, 2016 for co-pending U.S. Appl. No. 14/882,973.
Non-Final Office Action dated Aug. 11, 2016 for co-pending U.S. Appl. No. 13/625,675.
Final Office Action dated Nov. 11, 2015 for co-pending U.S. Appl. No. 13/625,675.
Non-Final Office Action dated Mar. 11, 2015 for co-pending U.S. Appl. No. 13/625,675.
Non-Final Office Action dated Dec. 28, 2016 for co-pending U.S. Appl. No. 13/628,702.
Non-Final Office Action dated Jan. 13, 2017 for co-pending U.S. Appl. No. 14/923,920
Final Office Action dated Jan. 12, 2017 for co-pending U.S. Appl. No. 14/841,942.
Non-Final Office Action dated Dec. 23, 2016 for co-pending U.S. Appl. No. 14/485,686.
Non-Final Office Action dated Jan. 27, 2017 for co-pending U.S. Appl. No. 14/485,687.
Non-Final Office Action dated Dec. 20, 2016 for co-pending U.S. Appl. No. 14/831,924.
Final Office Action dated Jan. 19, 2017 for co-pending U.S. Appl. No. 13/660,855.
Final Office Action dated Nov. 25, 2016 for co-pending U.S. Appl. No. 15/152,744.
Non-Final Office Action dated Dec. 15, 2016 for co-pending U.S Appl. No. 14/848,447.
Non-Final Office Action dated Dec. 9, 2016 for co-pending U.S. Appl. No. 14/927,614.
International Search Report for PCT Application No. PCT/US2016/050859 dated Dec. 9, 2016.
International Search Report and Written Opinion for PCT/US2017/012271, dated May 22, 2017.
Non-Final Office Action dated Apr. 24, 2017 for co-pending U.S. Appl. No. 14/738,485.
Final Office Action dated May 4, 2017 for co-pending U.S. Appl. No. 15/143,942.
Final Office Action dated May 30, 2017 for co-pending U.S. Appl. No. 13/625,675.
Final Office Action dated Apr. 19, 2017 for co-pending U.S. Appl. No. 15/219,640.
Non-Final Office Action dated Jun. 1, 2017 for co-pending U.S. Appl. No. 15/219,640.
Final Office Action dated May 2, 2017 for co-pending U.S. Appl. No. 15/219,676.
Non-Final Office Action dated May 10, 2017 for co-pending U.S. Appl. No. 14/882,973.
Yergin, Daniel, The Quest: Energy, Security, and the Remaking of the Modern World, 2011.
Gold, Russell, The Boom: How Fracking Ignited the American Energy Revolution and Changed the World, 2014.
Yergin, Daniel, Stepping on the Gas, Wall Street Journal, Apr. 2, 2011.
Raimi, Daniel et al., Dunn County and Watford City, North Dakota: A case study of the fiscal effects of Bakken shale development, Duke University Energy Initiative, May 2016.
Local Economic Impacts Related to Marcellus Shale Development, The Center for Rural Pennyslvania, Sep. 2014.

Eagle Ford Shale Task Force Report, Railroad Commission of Texas, Convened and Chaired by David Porter, Mar. 2013.
*Sandbox Logistics LLC et al* v. *Grit Energy Solutions LLC*, 3:16-cv-00012, 73.Parties' P.R. 4-3 Joint Claim Construction and Prehearing Statement by Oren Technologies LLC, SandBox Enterprises LLC, SandBox Logistics LLC, Nov. 17, 2016.
Beard, Tim, Fracture Design in Horizontal Shale Wells—Data Gathering to Implementation, EPA Hydraulic Fracturing Workshop, Mar. 10-11, 2011.
Economic Impact of the Eagle Ford Shale, Center for Community and Business Research at the University of Texas at San Antonio's Institute for Economic Development, Sep. 2014.
Kelsey, Timothy W. et al., Economic Impacts of Marcellus Shale in Pennsylvania: Employment and Income in 2009, The Marcellus Shale Education & Training Center, Aug. 2011.
2006 Montana Commercial Vehicle Size and Weight and Safety Trucker's Handbook, Montana Department of Transportation Motor Carrier Services Division, Fifth Edition, Jun. 2010.
Budzynski, Brian W., Never Meant to Take the Weight, Roads & Bridges, Apr. 2015.
Interstate Weight Limits, 23 C.F.R. § 658, Apr. 1, 2011.
VIN Requirements, 49 C.F.R. § 565, Oct. 1, 2011.
Benson, Mary Ellen et al., Frac Sand in the United States—A Geological and Industry Overview, U.S. Department of be Interior, U.S. Geological Survey, 2015-2017.
Beekman, Thomas J. et al., Transportation Impacts of the Wisconsin Fracture Sand Industry, Wisconsin Department of Transportation, Mar. 2013.
U.S. Silica Company, Material Safety Data Sheet, Jan. 2011.
Texas Transportation Code, Chapter 621, General Provisions Relating to Vehicle Size and Weight (Sec. 621.101 affective Sep. 1, 2005 and Section 621.403 effective Sep. 1, 1995).
Garner, Dwight, Visions of an Age When Oil Isn't King, New York Times, Sep. 20, 2011.
File History for U.S. Appl. No. 61/538,616, Robert A. Harris, Sep. 23, 2011. (21 pages).
Arrows Up, Inc., Jumbo BTS—Bulk Transport System, Aug. 1, 2014.
Arrows Up, Inc., Reusable Packaging Association, Member Spotlight: John Allegrelli, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Final Office Action dated Oct. 13, 2017 for co-pending U.S. Appl. No. 15/398,950.
Non-Final Office Action dated Sep. 21, 2017 for co-pending U.S. Appl. No. 15/413,822.
Non-Final Office Action dated Oct. 5, 2017 for co-pending U.S. Appl. No. 14/848,447.
Final Office Action dated Sep. 21, 2017 for co-pending U.S. Appl. No. 14/922,836.
Non-Final Office Action dated Sep. 27, 2017 for co-pending U.S. Appl. No. 14/996,362.
Non-Final Office Action dated Sep. 28, 2017 for co-pending U.S. Appl. No. 13/628,702.
Final Office Action dated Jan. 22, 2018 for co-pending U.S. Appl. No. 13/628,702.
Final Office Action dated Jan. 25, 2018 for co-pending U.S. Appl. No. 15/602,666.
Final Office Action dated Feb. 6, 2018 for co-pending U.S. Appl. No. 15/475,354.
Non-Final Office Action dated Feb. 9, 2018 for co-pending U.S. Appl. No. 15/587,926.
Non-Final Office Action dated Feb. 15, 2018 for co-pending U.S. Appl. No. 14/922,836.
Final Office Action dated Dec. 27, 2017 for co-pending U.S. Appl. No. 14/943,182.
Non-Final Office Action dated Sep. 8, 2017 for co-pending U.S. Appl. No. 15/475,354.
Non-Final Office Action dated Sep. 8, 2017 for co-pending U.S. Appl. No. 15/143,942.
International Search Report and Written Opinion for PCT/US17/34603 dated Aug. 22, 2017.
Non-Final Office Action dated Aug. 30, 2017 for co-pending U.S. Appl. No. 14/943,182.
Non-Final Office Action dated Aug. 4, 2017 for co-pending U.S. Appl. No. 13/625,675.
Non-Final Office Action dated Jul. 26, 2017 for co-pending U.S. Appl. No. 15/463,201.
Final Office Action dated Jul. 27, 2017 for co-pending U.S. Appl. No. 14/738,485.
Non-Final Office Action dated Aug. 3, 2017 for co-pending U.S. Appl. No. 15/219,676.
Beckwith, Robin, Proppants: Where in the World, Proppant Shortage, JPT, Apr. 2011 (6 pages).
Kullman, John, The Complicated World of Proppant Selection . . . , South Dakota School of Mines & Technology, Oct. 2011 (65 pages).
Lafollette, Randy, Key Considerations for Hydraulic Fracturing of Gas Shales, BJ Services Company, Sep. 9, 2010 (53 pages).
WW Trailers Inc., Model GN2040EZ datasheet, Portland, OR, Jan. 2007 (4pages).
WW Trailers Inc., Model GN204S9A datasheet, Portland, OR, Jan. 2007 (4pages).
Smith, Ryan E., Prefab Architecture, A Guide to Modular Design and Construction, John Wiley & Sons, Inc., 2010.
OSHA-NIOSH, Hazard Alert: Worker Exposure to Silica during Hydraulic Fracturing, Jun. 2012.
Tremoglie, Michael P., Legal NewsLine, OSHA, NIOSH issue Tracking health alert (/stories/510527440-oshaniosh-issue-fracking-health-alert), Jun. 25, 2012.
Beckwith, Robin, Proppants: Where in the World, Journal of Petroleum Technology, Apr. 2011.
Final Office Action dated Feb. 27, 2018 for co-pending U.S. Appl. No. 15/143,942.
Non-Final Office Action dated Apr. 26, 2018 for co-pending U.S. Appl. No. 15/616,783.
Final Office Action dated Apr. 23, 2018 for co-pending U.S. Appl. No. 14/848,447.
Final Office Action dated Mar. 16, 2018 for co-pending U.S. Appl. No. 14/996,362.
Final Office Action dated Mar. 14, 2018 for co-pending U.S. Appl. No. 15/144,450.
Randy Lafollette, Key Considerations for Hydraulic Fracturing of Gas Shales, May 12, 2010.
Case No. 4:17-cv-00589, Plaintiffs' P.R. 3-1 and 3-2 Infringement Contentions and Disclosures, Jun. 8, 2017.
ISO 1496-1: International Standard, Series 1 Freight Containers—Specification and Testing—Part 1, General Cargo Containers, Fifth Edition, Aug. 15, 1990.
ISO 6346: International Standard, Freight Containers—Coding, Identification and Marking, Third Edition, Dec. 1, 1995.
ISO/IEC 15416: International Standard, Information Technology—Automatic Identification and Data Capture Techniques—Bar Code Print Quality Test Specification—Linear Symbols, First Edition, Aug. 15, 2000.
Hoel, Lester A., Giuliano, Genevieve and Meyer, Michael D., Portions of Intermodal Transportation: Moving Freight in a Global Economy, Copyright Eno Transportation Foundation, 2011.

* cited by examiner

*Primary Examiner* — Philip S Hyder
(74) *Attorney, Agent, or Firm* — Hogan Lovells US LLP

(57) CLAIM

The ornamental design for a proppant vessel, as shown and described.

DESCRIPTION

*This application is a reissue application of U.S. Pat. No. D688,351 issued on Aug. 20, 2013, from U.S. application Ser. No. 29/436,170, filed on Nov. 2, 2012. Application Ser.*

*No. 29/518,134 filed Feb. 20, 2015, is a divisional reissue application of this reissue application. Application Ser. No. 29/518,135 filed Feb. 20, 2015, is also a divisional reissue application of this reissue application.*

*Notice: More than one reissue application has been filed for the reissue of U.S. Pat. No. D688,351. The reissue applications are application Ser. No. 29/500,681 (the present application) filed Aug. 27, 2014, application Ser. No. 29/518,134, filed Feb. 20, 2015, and application Ser. No. 29/518,135 filed Feb. 20, 2015.*

*FIG. 8 is an upper perspective view of an alternate embodiment of the proppant vessel embodying our design;*

*FIG. 9 is a front elevational view of the embodiment of FIG. 8;*

*FIG. 10 is a rear elevational view of the embodiment of FIG. 8;*

*FIG. 11 is a right side elevational view of the embodiment of FIG. 8;*

*FIG. 12 is a left side elevational view of the embodiment of FIG. 8;*

*FIG. 13 is a top plan view of the embodiment of FIG. 8;*

*FIG. 14 is a bottom plan view of the embodiment of FIG. 8;*

*FIG. 15 is an upper perspective view of another alternate embodiment of the proppant vessel embodying our design;*

*FIG. 16 is a front elevational view of the embodiment of FIG. 15;*

*FIG. 17 is a rear elevational view of the embodiment of FIG. 15;*

*FIG. 18 is a right side elevational view of the embodiment of FIG. 15;*

*FIG. 19 is a left side elevational view of the embodiment of FIG. 15;*

*FIG. 20 is a top plan view of the embodiment of FIG. 15; and,*

*FIG. 21 is a bottom plan view of the embodiment of FIG. 15.*

Figure 1:
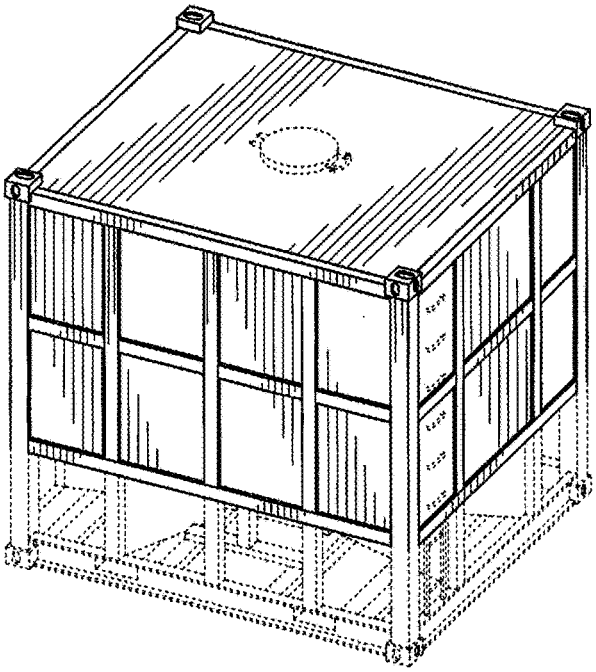
FIG. 1 is an upper perspective view of the proppant vessel showing our design[.]*;*
Figure 2:
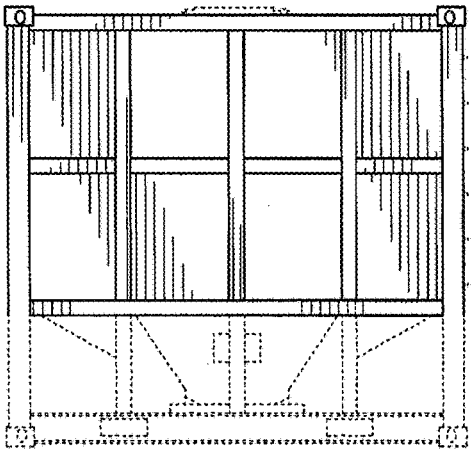
FIG. 2 is a front [elevation] *elevational* view [thereof] *of FIG. 1*.
Figure 3:
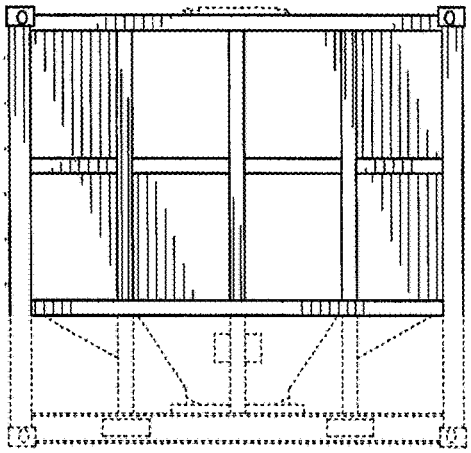
FIG. 3 is a rear [elevation] *elevational* view [thereof] *of FIG. 1*.
Figure 4:
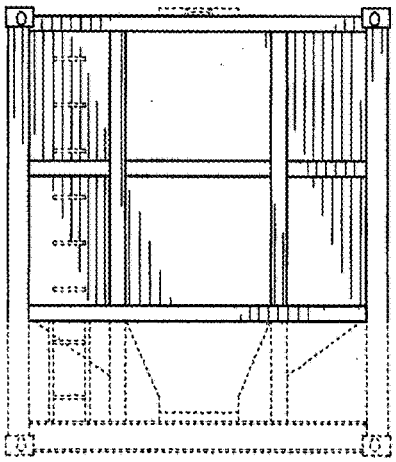
FIG. 4 is a *right* side [elevation] *elevational* view [thereof] *of FIG. 1*.
Figure 5:
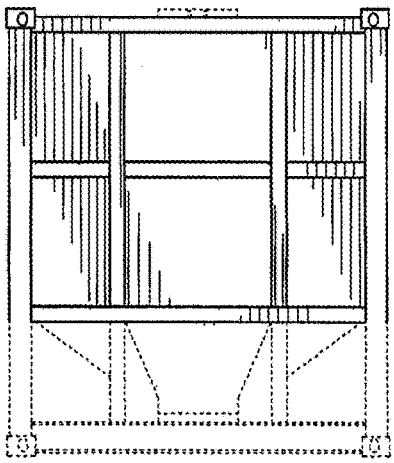
FIG. 5 is [an opposite] *a left* side [elevation] *elevational* view [thereof] *of FIG. 1*.
Figure 6:
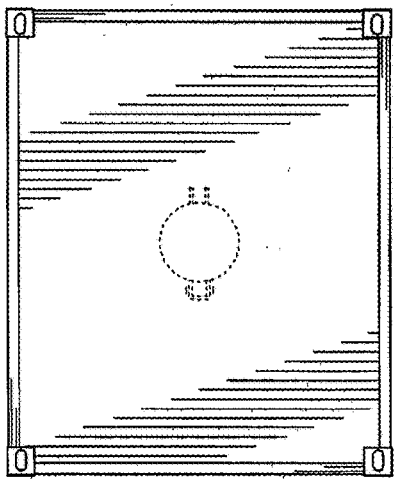
FIG. 6 is a top plan view [thereof] *of FIG. 1*.
Figure 7:
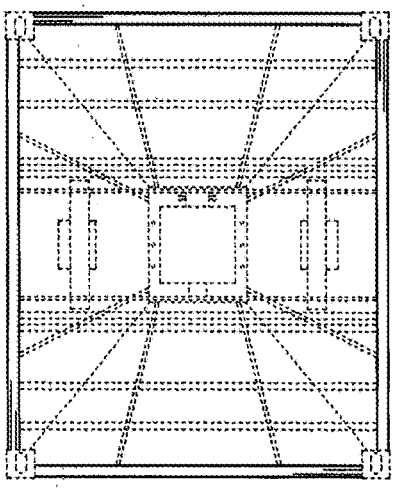
FIG. 7 is a bottom plan view [thereof.] *of FIG. 1;*

[The features presented in broken lines are for environmental purposes only and form no part of the claimed design] *The broken lines depict portions of the proppant vessel in which the design is embodied that are not considered part of the claimed design.*

1 Claim, 6 Drawing Sheets

---

Matter enclosed in heavy brackets [ ] appears in the original patent but forms no part of this reissue; matter printed in italics indicates the additions made by reissue.

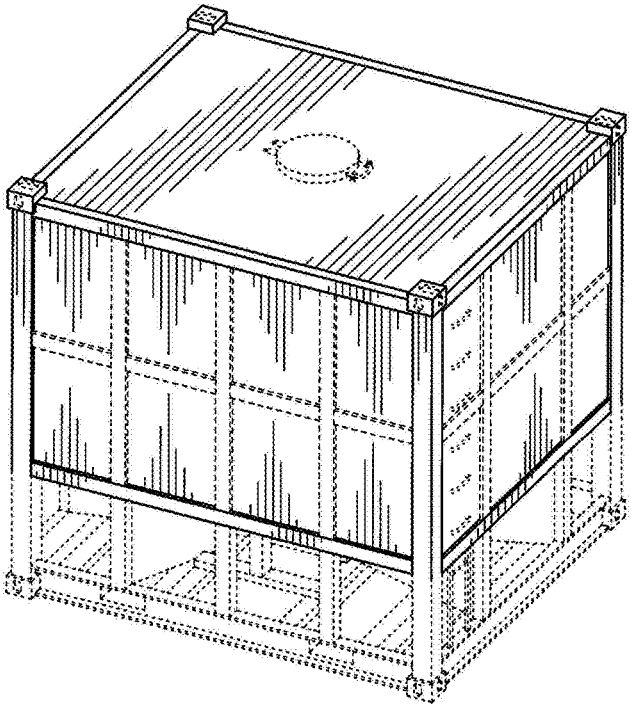
FIG.8
NEW
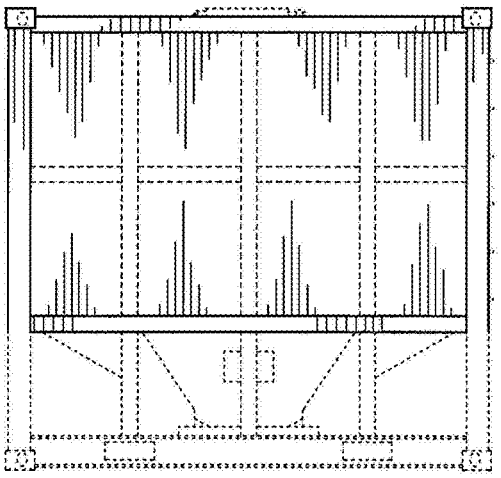
FIG.9
NEW
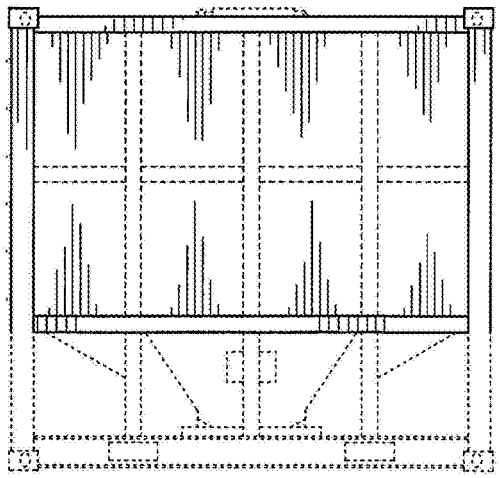
FIG.10
NEW

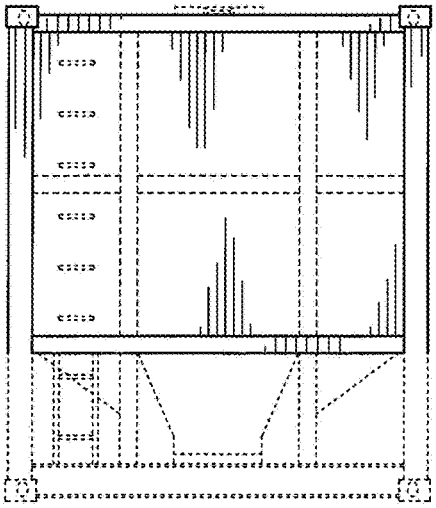
FIG. 11
NEW
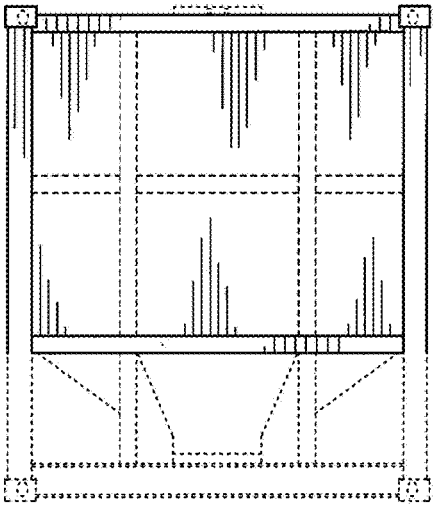
FIG. 12
NEW
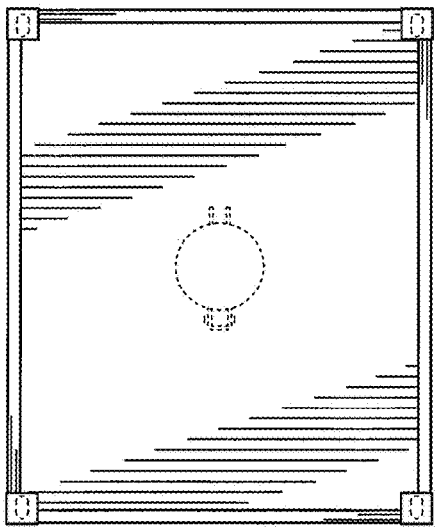
FIG. 13
NEW
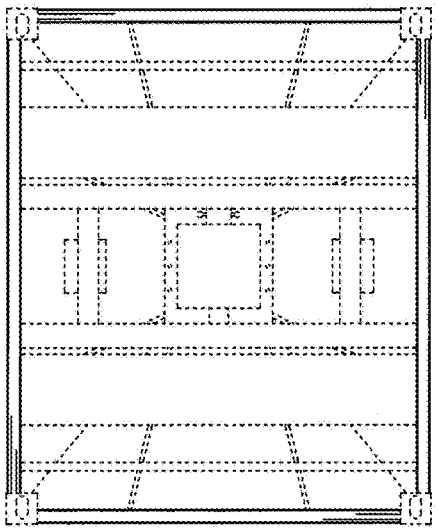
FIG. 14
NEW

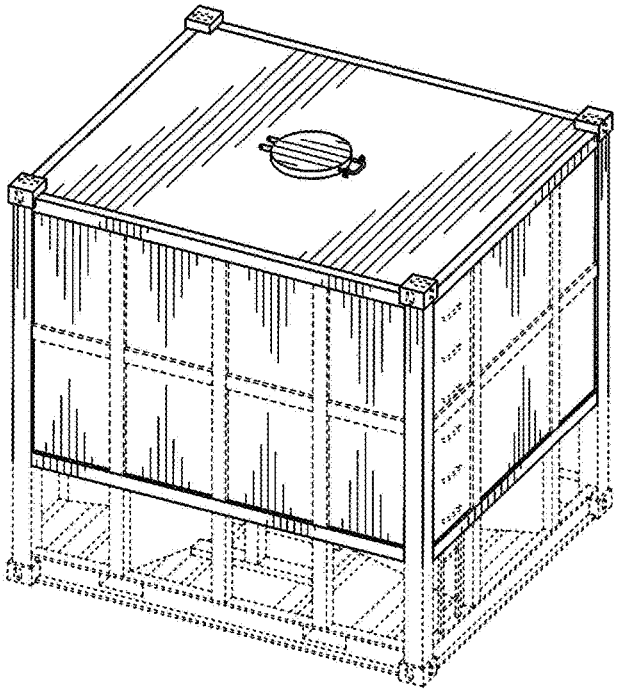
FIG. 15
NEW
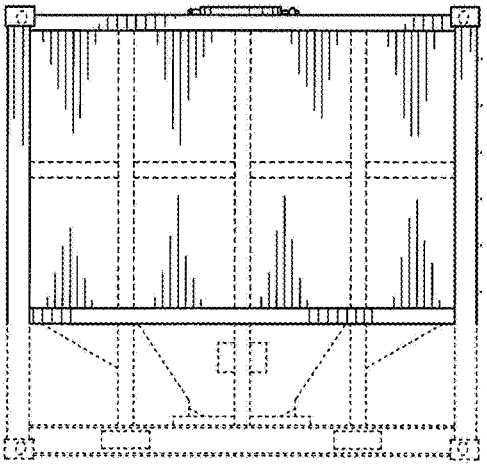
FIG. 16
NEW
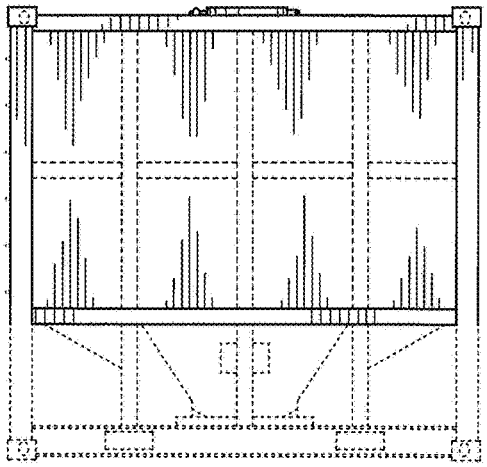
FIG. 17
NEW

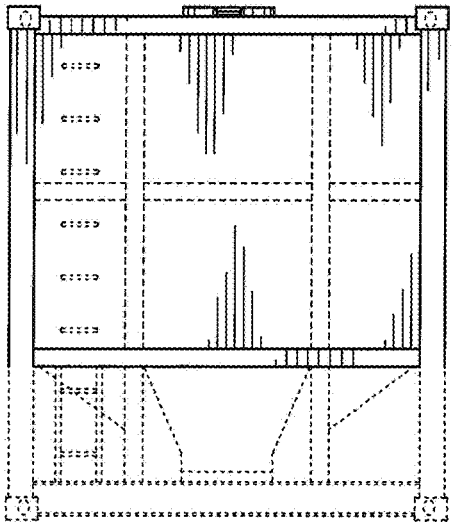
FIG. 18
NEW
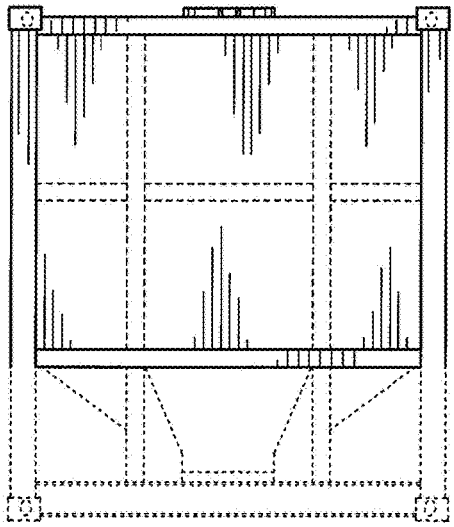
FIG. 19
NEW
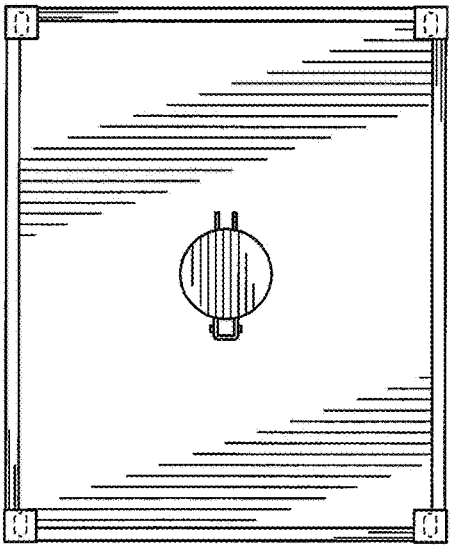
FIG. 20
NEW
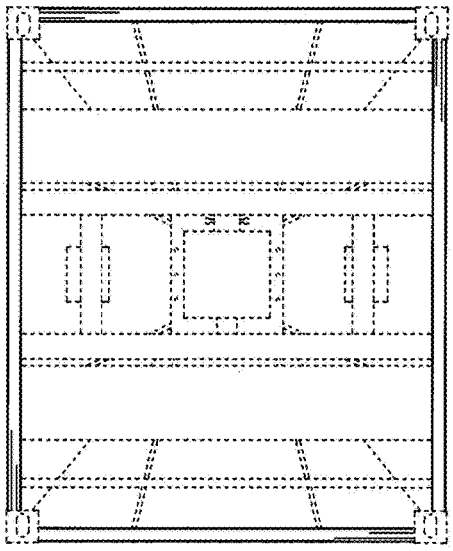
FIG. 21
NEW